(12) United States Patent
Agbabian

(10) Patent No.: US 8,904,503 B2
(45) Date of Patent: Dec. 2, 2014

(54) SYSTEMS AND METHODS FOR PROVIDING ACCESS TO DATA ACCOUNTS WITHIN USER PROFILES VIA CLOUD-BASED STORAGE SERVICES

(71) Applicant: Symantec Corporation, Mountain View, CA (US)

(72) Inventor: Paul Agbabian, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 39 days.

(21) Appl. No.: 13/742,217

(22) Filed: Jan. 15, 2013

(65) Prior Publication Data
US 2014/0201824 A1    Jul. 17, 2014

(51) Int. Cl.
| | | |
|---|---|---|
| H04L 29/06 | (2006.01) | |
| G06F 21/62 | (2013.01) | |
| H04L 9/00 | (2006.01) | |
| G06F 15/16 | (2006.01) | |
| H04L 29/00 | (2006.01) | |

(52) U.S. Cl.
CPC ............ H04L 63/08 (2013.01); G06F 21/6245 (2013.01); *G06F 2221/2141* (2013.01)
USPC .............. 726/6; 713/153; 709/203; 709/206; 709/213; 709/219; 709/228; 380/33; 380/277

(58) Field of Classification Search
None
See application file for complete search history.

(56) References Cited

U.S. PATENT DOCUMENTS

| | | | |
|---|---|---|---|
| 6,947,556 B1 | 9/2005 | Matyas, Jr. et al. | |
| 7,487,219 B1 * | 2/2009 | Jia et al. ....................... | 709/206 |
| 7,505,978 B2 | 3/2009 | Bodin et al. | |
| 7,949,681 B2 | 5/2011 | Bodin et al. | |
| 8,090,102 B2 | 1/2012 | Kitaya et al. | |
| 8,458,494 B1 | 6/2013 | Bogorad | |
| 8,654,971 B2 * | 2/2014 | Orsini et al. .................... | 380/33 |
| 2001/0029581 A1 | 10/2001 | Knauft | |
| 2003/0163705 A1 | 8/2003 | Richards, Jr. et al. | |
| 2003/0174841 A1 | 9/2003 | Nault et al. | |

(Continued)

FOREIGN PATENT DOCUMENTS

EP    2336886    6/2011

OTHER PUBLICATIONS

Martin Mulazzani et al.; Dark Clouds on the Horizon: Using Cloud Storage as Attack Vector and Online Slack Space; SBA Research; Sep. 18, 2011.

(Continued)

*Primary Examiner* — Shin-Hon Chen
(74) *Attorney, Agent, or Firm* — ALG Intellectual Property, LLC

(57) ABSTRACT

A computer-implemented method for providing access to data accounts within user profiles via cloud-based storage services may include (1) identifying a user profile associated with a user of a cloud-based storage service, (2) identifying a plurality of data accounts within the user profile associated with the user of the cloud-based storage service, (3) detecting a request from a client-based application associated with the user of the cloud-based storage service to access at least a portion of data stored in a data account within the user profile, (4) locating a unique account name that identifies the data account in the request, and then (5) satisfying the request from the client-based application associated with the user to access the portion of data stored in the data account via the cloud-based storage service. Various other methods, systems, and computer-readable media are also disclosed.

19 Claims, 6 Drawing Sheets

(56) References Cited

U.S. PATENT DOCUMENTS

| | | | |
|---|---|---|---|
| 2005/0157880 A1 | 7/2005 | Kurn et al. | |
| 2010/0172504 A1 | 7/2010 | Allen et al. | |
| 2010/0217987 A1 | 8/2010 | Shevade | |
| 2010/0257351 A1 | 10/2010 | O'Connor et al. | |
| 2010/0306176 A1 | 12/2010 | Johnson et al. | |
| 2010/0333116 A1* | 12/2010 | Prahlad et al. | 719/328 |
| 2011/0258333 A1 | 10/2011 | Pomerantz et al. | |
| 2012/0303736 A1* | 11/2012 | Novotny et al. | 709/213 |
| 2012/0328105 A1* | 12/2012 | Mukkara et al. | 380/277 |
| 2013/0111217 A1 | 5/2013 | Kopasz et al. | |
| 2013/0305039 A1* | 11/2013 | Gauda | 713/153 |

OTHER PUBLICATIONS

Amazon; Amazon Simple Storage Service (Amazon S3); Jul. 2006; http://aws.amazon.com/s3/, as accessed Mar. 2, 2012.

Box.Net, Inc.; Comprehensive security at all levels; Mar. 2009, http://www.box.net/static/download/Security_Overview_2-1.pdf, as accessed Mar. 2, 2012.

Sarah Perez; Finally! Bitcasa CEO Explains How the Encryptions Works; Sep. 18, 2011; http://techcrunch.com/2011/09/18/bitcasa-explains-encryption/, as accessed Mar. 2, 2012.

Mark Storer et al.; Secure Data Deduplication; StorageSS' '08; Oct. 31, 2008; Fairfax, VA, USA.

International Search Report and Written Opinion of the International Searching Authority from related International Application No. PCT/US2013/028224; Jun. 3, 2013.

Symantec Corporation; Systems and Methods for Secure Third-Party Data Storage; International Application No. PCT/US2013/028224, Filed Feb. 28, 2013.

Walter Bogorad; Systems and Methods for Secure Third-Party Data Storage; U.S. Appl. No. 13/800,305; Filed Mar. 13, 2013.

Walter Bogorad; Systems and Methods for Secure Third-Party Data Storage; U.S. Appl. No. 13/787,757; Filed Mar. 6, 2013.

Trimbak Bardale; Systems and Methods for Securely Deduplicating Data Owned by Multiple Entities; U.S. Appl. No. 12/874,640; Filed Sep. 2, 2012.

Yu, Shucheng et al., "Achieving Secure, Scalable, and Fine-grained Data Access Control in Cloud Computing", Infocom, 2010 Proceedings IEEE, IEEE, Piscataway, NJ, USA, (Mar. 14, 2010).

Tsai, Wei-Tek et al., "Role-Based Access-Control Using Reference Ontology in Clouds", Autonomous Decetralized Systems (ISADS), 2011 10th International Symposium on, IEEE, (Mar. 23, 2011).

"Private Cloud for Your Enterprise—Installable Cloud Storage Solution for Security & Control", http://www.gladinet.com/CloudEnterprise/, as accessed Apr. 16, 2014, Gladinet, Inc., (2008).

"Syncplicity by EMC", http://www.syncplicity.com/solutions/, as accessed Apr. 16, 2014, Syncplicity LLC, (2007).

"Hybrid Deployment Architecture", http://www.ctera.com/products/technology/hybrid-deployment-architecture, as accessed Apr. 16, 2014, CTERA Networks Ltd., (Oct. 19, 2012).

Banerji, Preeta et al., "Deploying an Enterprise-Ready Content Sync-and-Share Solution", http://www.intel.com/content/dam/www/public/us/en/documents/white-papers/deploying-an-enterprise-ready-content-sync-and-share-solution.pdf, as accessed Apr. 16, 2014, IT@Intel White Paper, Intel Corporation, (Sep. 2013).

"Newest ownCloud Enterprise File Sync and Share Keeps IT in Control of Corporate Data", https://owncloud.com/blog/newest-owncloud-enterprise-file-sync-share-keeps-control-corporate-data, as accessed Apr. 16, 2014, ownCloud Inc., Lexington, MA, (Mar. 11, 2014),\.

"Kiteworks for Enterprise IT—Cloud Deployment Options", http://www.accellion.com/solutions/enterprise-it-and-security/cloud-deployment-options, as accessed Apr. 16, 2014, Accellion, (Oct. 1, 2013).

Walter Bogorad; Systems and Methods for Secure Hybrid Third-Party Data Storage; U.S. Appl. No. 14/271,967; Filed May 7, 2014.

* cited by examiner

SYSTEMS AND METHODS FOR PROVIDING ACCESS TO DATA ACCOUNTS WITHIN USER PROFILES VIA CLOUD-BASED STORAGE SERVICES

BACKGROUND

In today's world of vast computing technology, some technology users are finding it increasingly difficult to separate certain types of stored data. In one example, some technology users may have difficulty separating data stored with different ownership rights. For example, an employee of an organization may store work-related data as well as personal data via a cloud-based storage service. In this example, the organization may maintain the right to access the employee's work-related data via the cloud-based storage service. Unfortunately, the cloud-based storage service may be unable to distinguish between the employee's work-related data and the employee's personal data. As a result, the organization may be able to access the employee's work-related data as well as the employee's personal data via the cloud-based storage service even though the organization does not necessarily have any ownership right to the employee's personal data.

In another example, some technology users may have difficulty separating certain portions of their own personal data. For example, a user may store various types of personal data in a user profile via a cloud-based storage service. In this example, the user may want to delegate access to a limited portion of the personal data stored in his or her user profile to another user via the cloud-based storage service. Unfortunately, the cloud-based storage service may be unable to distinguish between the access rights associated with one portion of personal data and another portion of personal data in the user's profile. As a result, the user may be unable to delegate access to one portion of personal data without necessarily delegating access to all of the personal data stored in his or her user profile via the cloud-based storage service.

What is needed, therefore, are systems and methods for providing access to data accounts within a user profile via a cloud-based storage service in accordance with the ownership and/or access rights associated with each of the data accounts within the user profile.

SUMMARY

As will be described in greater detail below, the instant disclosure generally relates to systems and methods for providing access to data accounts within user profiles via cloud-based storage services such that the data accounts store data separated by unique account names and/or unique encryption keys.

In one example, a computer-implemented method for providing access to data accounts within user profiles via cloud-based storage services may include (1) identifying a user profile associated with a user of a cloud-based storage service, (2) identifying a plurality of data accounts within the user profile associated with the user of the cloud-based storage service, (3) detecting a request from a client-based application associated with the user of the cloud-based storage service to access at least a portion of data stored in a data account within the user profile, (4) locating a unique account name that identifies the data account in the request, and then (5) satisfying the request from the client-based application associated with the user to access the portion of data stored in the data account via the cloud-based storage service by (a) locating a unique encryption key that corresponds to the data account identified by the unique account name, (b) decrypting the portion of data stored in the data account with the unique encryption key that corresponds to the data account, and then (c) providing a decrypted version of the portion of data stored in the data account to the client-based application associated with the user via the cloud-based storage service.

In some examples, the method may also include authenticating the client-based application with each of the data accounts within the user profile. In such examples, the method may further include enabling the client-based application to access each of the data accounts within the user profile in response to authenticating the client-based application with each of the data accounts within the user profile.

In some examples, the method may also include obtaining user credentials associated with each of the plurality of data accounts within the user profile from the client-based application associated with the user. In one example, the user credentials may include a single set of user credentials associated with each of the plurality of data accounts within the user profile from the client-based application. In another example, the user credentials may include a different set of user credentials for each of the plurality of data accounts within the user profile from the client-based application associated with the user.

In such examples, the method may further include searching an authentication database associated with the cloud-based storage service for the user credentials obtained from the client-based application associated with the user. In addition, the method may include identifying the user credentials obtained from the client-based application while searching the authentication database and then determining that the user credentials obtained from the client-based application correspond to each of the plurality of data accounts within the user profile.

In some examples, the method may also include delegating an authentication of the client-based application with at least one of the data accounts to an additional instance of the client-based application associated with an additional user of the cloud-based storage service. In such examples, the method may further include obtaining user credentials associated with the at least one of the data accounts from the additional instance of the client-based application associated with the additional user.

In addition, the method may include searching an authentication database associated with the cloud-based storage service for the user credentials obtained from the additional instance of the client-based application associated with the additional user. Moreover, the method may include identifying the user credentials obtained from the additional instance of the client-based application while searching the authentication database and then determining that the user credentials obtained from the additional instance of the client-based application correspond to the at least one of the data accounts within the user profile.

In some examples, the method may also include detecting a storage request from the client-based application to store the portion of data in the data account. In such examples, the method may further include locating the unique account name that identifies the data account in the storage request and satisfying the storage request from the client-based application via the cloud-based storage service. For example, the method may include locating the unique encryption key that corresponds to the data account identified by the unique account name. In addition, the method may include encrypting the portion of data to be stored in the data account with the unique encryption key that corresponds to the data account and then storing an encrypted version of the portion of data in the data account within the user profile via the cloud-based storage service.

In some examples, the method may also include authenticating the client-based application with the data account within the user profile. In such examples, the method may further include enabling the client-based application to delegate access to the data account within the user profile to an additional instance of the client-based application associated with an additional user of the cloud-based storage service.

In some examples, the method may also include detecting a delegation request from the client-based application to delegate access to the data account within the user profile to the additional instance of the client-based application associated with the additional user. In such examples, the method may further include locating a unique account name that identifies the data account in the delegation request and then satisfying the delegation request from the client-based application by delegating access to the data account within the user profile to the additional instance of the client-based application associated with the additional user via the cloud-based storage service. For example, the method may include delegating access to the data account within the user profile such that the additional instance of the client-based application associated with the additional user is able to access the data account within the user profile but unable to access the plurality of data accounts within the user profile.

In some examples, the method may also include identifying a plurality of data zones within the data account identified by the unique account name and locating a unique zone name that identifies a data zone within the data account in the detected request. In such examples, the method may include locating a unique encryption key that corresponds to the data zone identified by the unique zone name. In addition, the method may include decrypting at least a portion of data stored in the data zone within the data account with the unique encryption key that corresponds to the data zone and then providing a decrypted version of the portion of data stored in the data zone within the data account to the client-based application via the cloud-based storage service.

In some examples, the method may also include detecting a delegation request from the client-based application to delegate access to a data zone within the data account to an additional instance of the client-based application associated with an additional user of the cloud-based storage service. In such examples, the method may include locating a unique zone name that identifies the data zone within the data account in the delegation request and then satisfying the delegation request from the client-based application by delegating access to the data zone within the data account to the additional instance of the client-based application associated with the additional user via the cloud-based storage service. For example, the method may include delegating access to the data zone within the data account such that the additional instance of the client-based application associated with the additional user is able to access the data zone within the data account but unable to access the plurality of data zones within the data account.

In one embodiment, a system for implementing the above-described method may include (1) an identification module programmed to (a) identify a user profile associated with a user of a cloud-based storage service and (b) identify a plurality of data accounts within the user profile associated with the user of the cloud-based storage service, (2) a detection module programmed to detect a request from a client-based application associated with the user of the cloud-based storage service to access at least a portion of data stored in a data account within the user profile, (3) a locating module programmed to locate a unique account name that identifies the data account in the request, and (4) an access module programmed to satisfy the request from the client-based application associated with the user to access the portion of data stored in the data account via the cloud-based storage service by (a) locating a unique encryption key that corresponds to the data account identified by the unique account name, (b) decrypting the portion of data stored in the data account with the unique encryption key that corresponds to the data account, and then (c) providing a decrypted version of the portion of data stored in the data account to the client-based application associated with the user via the cloud-based storage service. The system may also include at least one processor configured to execute the identification module, the detection module, the locating module, and the access module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a user profile associated with a user of a cloud-based storage service, (2) identify a plurality of data accounts within the user profile associated with the user of the cloud-based storage service, (3) detect a request from a client-based application associated with the user of the cloud-based storage service to access at least a portion of data stored in a data account within the user profile, (4) locate a unique account name that identifies the data account in the request, and then (5) satisfy the request from the client-based application associated with the user to access the portion of data stored in the data account via the cloud-based storage service by (a) locating a unique encryption key that corresponds to the data account identified by the unique account name, (b) decrypting the portion of data stored in the data account with the unique encryption key that corresponds to the data account, and then (c) providing a decrypted version of the portion of data stored in the data account to the client-based application associated with the user via the cloud-based storage service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
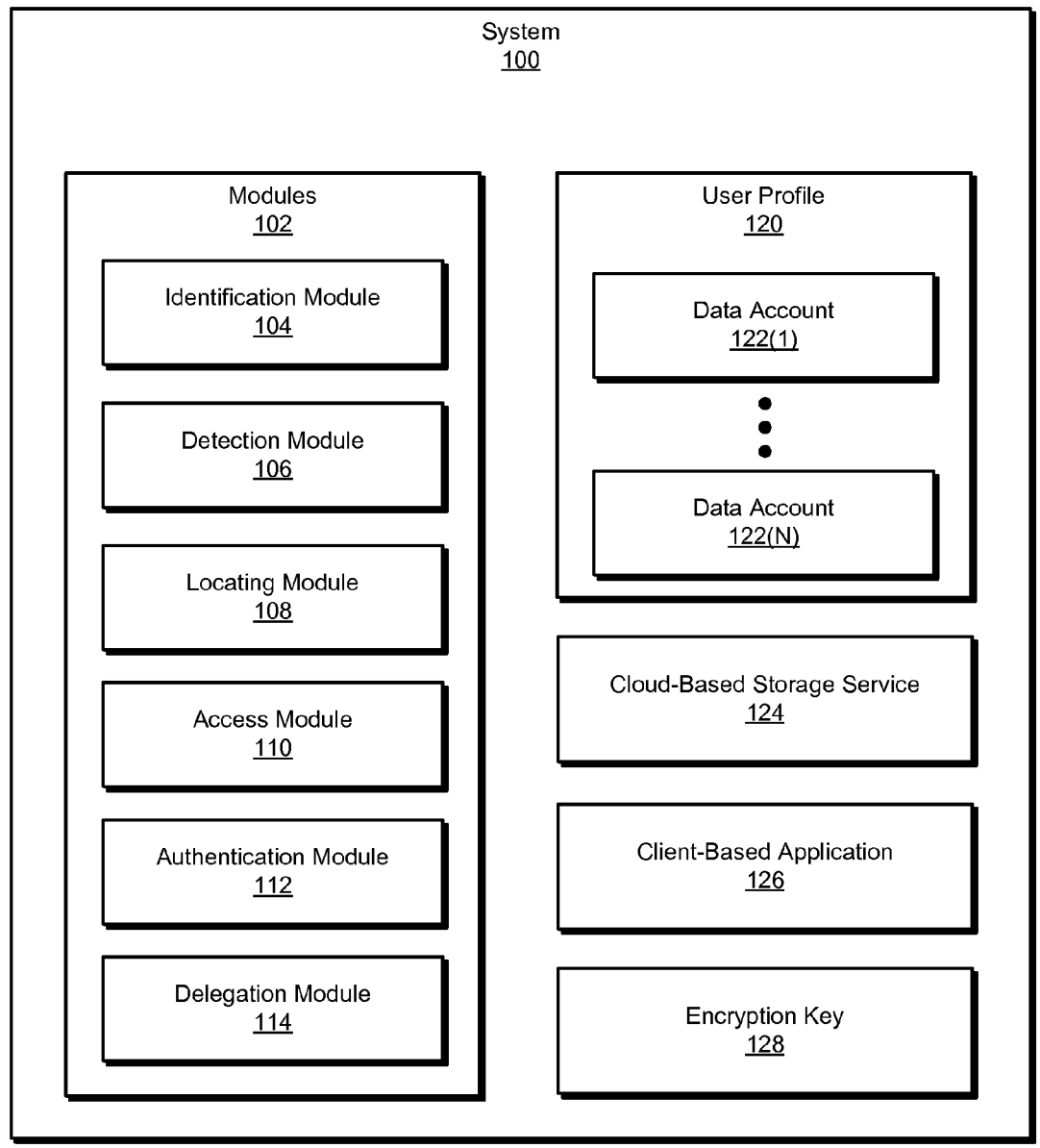
FIG. 1 is a block diagram of an exemplary system for providing access to data accounts within user profiles via cloud-based storage services.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing access to data accounts within user profiles via cloud-based storage services. As will be explained in greater detail below, by providing a unique account name and a unique encryption key to each data account within a user profile, the various systems and methods described herein may enable a user of a cloud-based storage service to securely separate data with different ownership and/or access rights within his or her user profile. In addition, by securely separating the data with different ownership and/or access rights within his or her user profile, the various systems and methods described herein may enable the user of the cloud-based storage service to control which data stored within his or her user profile is accessible (or exposed) to one or more additional users of the cloud-based storage service.

Figure 2:
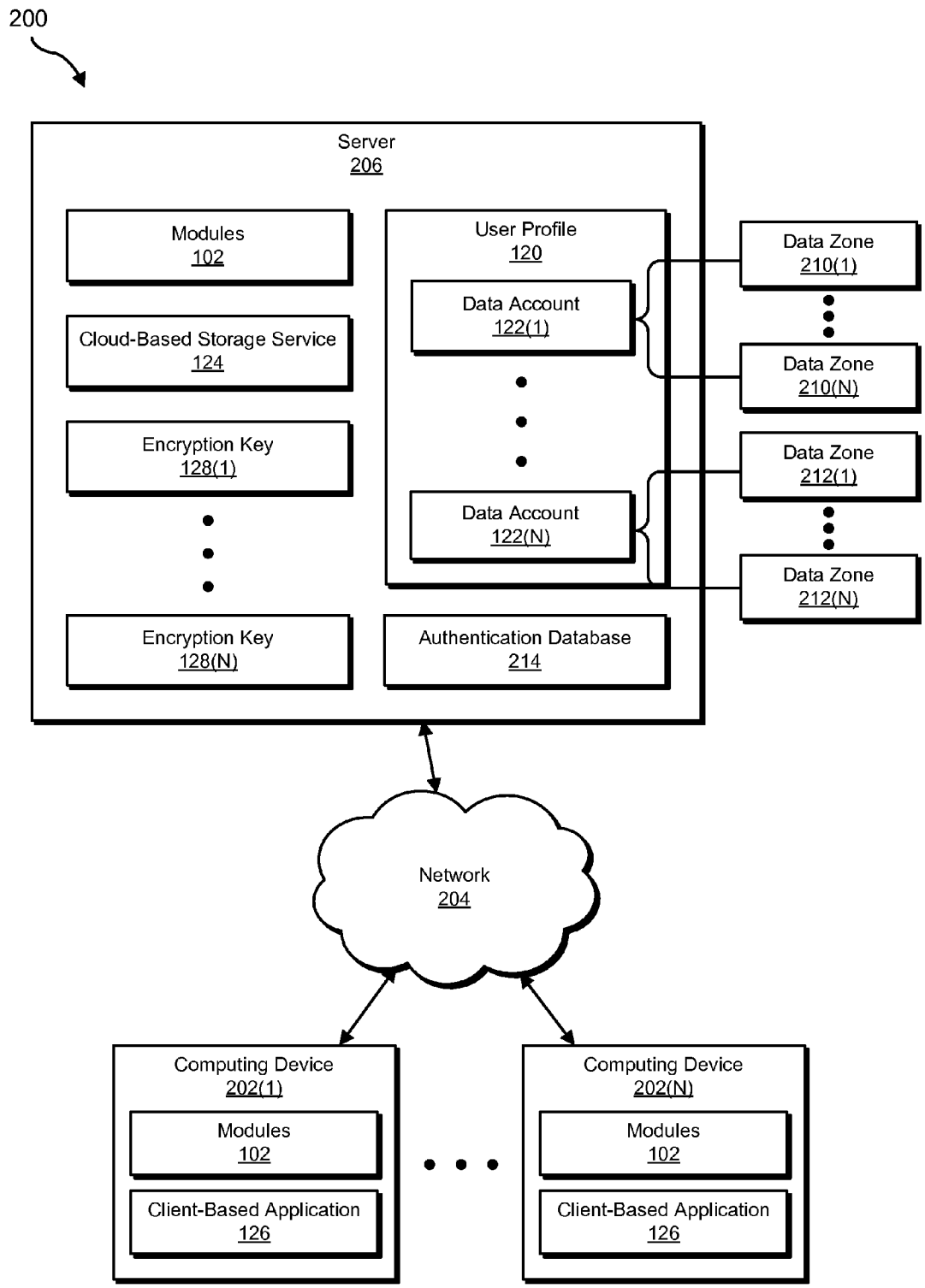
FIG. 2 is a block diagram of an exemplary system for providing access to data accounts within user profiles via cloud-based storage services.

The following will provide, with reference to FIGS. 1-2, detailed descriptions of exemplary systems for providing access to data accounts within user profiles via cloud-based storage services. Detailed descriptions of corresponding computer-implemented methods will be provided in connection with FIG. 3. Detailed descriptions of exemplary requests to access data stored in data accounts within a user profile will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for providing access to data accounts within user profiles via cloud-based storage services. As illustrated in this figure, exemplary system 100 may include one or more modules 102 for performing one or more tasks. For example, and as will be explained in greater detail below, exemplary system 100 may include an identification module 104 programmed to (1) identify a user profile associated with a user of a cloud-based storage service and (2) identify a plurality of data accounts within the user profile associated with the user of the cloud-based storage service. Exemplary system 100 may also include a detection module 106 programmed to detect a request from a client-based application associated with the user of the cloud-based storage service to access at least a portion of data stored in a data account within the user profile.

In addition, and as will be described in greater detail below, exemplary system 100 may include a locating module 108 programmed to locate a unique account name that identifies the data account in the request. Exemplary system 100 may also include an access module 110 programmed to satisfy the request from the client-based application associated with the user to access the portion of data stored in the data account via the cloud-based storage service by (1) locating a unique encryption key that corresponds to the data account identified by the unique account name, (2) decrypting the portion of data stored in the data account with the unique encryption key that corresponds to the data account, and then (3) providing a decrypted version of the portion of data stored in the data account to the client-based application associated with the user via the cloud-based storage service.

Moreover, as will be described in greater detail below, exemplary system 100 may include an authentication module 112 programmed to authenticate the client-based application with each of the data accounts within the user profile. Exemplary system 100 may further include a delegation module 114 programmed to enable the client-based application to delegate access to the data account within the user profile to an additional instance of the client-based application associated with an additional user of the cloud-based storage service. Although illustrated as separate elements, one or more of modules 102 in FIG. 1 may represent portions of a single module or application.

As illustrated in FIG. 1, exemplary system 100 may also include one or more cloud-based storage services, such as cloud-based storage service 124. The phrase "cloud-based storage service," as used herein, generally refers to any type or form of service (e.g., Storage as a Service ("SaaS")) capable of storing data accessible to one or more remote computing devices (e.g., one or more of computing devices 202(1)-(N) in FIG. 2) via a network (e.g., network 204 in FIG. 2). Cloud-based storage service 124 may represent portions of a single physical storage device or plurality of physical storage devices.

In some examples, cloud-based storage service 124 may provide virtualization of the data accessible to the remote computing devices. In one example, cloud-based storage service 124 may virtualize the data such that the remote computing devices are able to access the data as an independent logical layer abstracted from the underlying physical storage device(s). In another example, cloud-based storage service 124 may virtualize the data such that the remote computing devices are able to access the data irrespective of any dependencies between the data at a file level and the location of the underlying physical storage device(s).

As illustrated in FIG. 1, exemplary system 100 may also include one or more user profiles, such as user profile 120. In one example, user profile 120 may be configured to store data uploaded by and accessible to a client-based application (e.g., client-based application 126) associated with a user of cloud-based storage service 124. In this example, user profile 120 may include a plurality of data accounts 122(1)-(N).

In some examples, each of data accounts 122(1)-(N) may have a unique account name within user profile 120. Additionally or alternatively, each of data accounts 122(1)-(N) may have a unique encryption key (e.g., encryption key 128) within user profile 120.

Although these account names and encryption keys may be unique with respect to user profile 120, these account names and encryption keys may not necessarily be unique with respect to all of cloud-based storage service 124. For example, data account 122(1) may have an account name and an encryption key that are unique to user profile 120. However, another data account within another user profile (not illustrated in FIG. 1) may have the same account name and encryption key as data account 122(1).

As illustrated in FIG. 1, exemplary system 100 may also include one or more client-based applications, such as client-based application 126. In one example, client-based application 126 may be installed on one or more computing devices (e.g., one or more of computing devices 202(1)-(N) in FIG. 2). In this example, client-based application 126 may enable the user of cloud-based storage service 124 to upload data to one or more of data accounts 122(1)-(N) and/or access data stored in one or more of data accounts 122(1)-(N) from such computing device(s).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more computing devices 202(1)-(N) in communication with a server 206 via a network 204. Computing devices 202(1)-(N) may be programmed with one or more of modules 102. Additionally or alternatively, server 206 may be programmed with one or more of modules 102.

As illustrated in FIG. 2, system 200 may also include one or more databases, such as authentication database 214. In one example, authentication database 214 may be configured to store any type or form of authentication information used to authenticate client-based application 126 with one or more of data accounts 122(1)-(N) within user profile 120. For example, authentication database 214 may store user credentials (such as usernames and passwords) associated with each of data accounts 122(1)-(N).

In one embodiment, system 200 may also include one or more data zones, such as data zones 210(1)-(N) and 212(1)-(N). Data zones 210(1)-(N) and 212(1)-(N) may represent sub-portions of data accounts 122(1)-(N) within user profile 120. Each of data zones 210(1)-(N) may have a unique zone name within data account 122(1). Similarly, each of data accounts 212(1)-(N) may have a unique zone name within data account 122(N).

Additionally or alternatively, each of data zones 210(1)-(N) and 212(1)-(N) may have a unique encryption key within data accounts 122(1)-(N). Although these zone names and encryption keys may be unique with respect to data accounts 122(1)-(N), these zone names and encryption keys may not necessarily be unique with respect to all of cloud-based storage service 124 (or even with respect to all of user profile 120). For example, data zone 210(1) may have a zone name and an encryption key that are unique to data account 122(1). However, another data zone within another data account (e.g., data account 122(N) or a data account within another user profile (not illustrated in FIG. 2)) may have the same zone name and encryption key as data zone 210(1).

In one embodiment, one or more of modules 102 from FIG. 1 may, when executed by at least one processor associated with one or more of computing devices 202(1)-(N) and/or server 206, facilitate one or more of computing devices 202 (1)-(N) and/or server 206 in providing access to data accounts within user profiles via cloud-based storage services. For example, and as will be described in greater detail below, one or more of modules 102 may cause one or more of computing devices 202(1)-(N) and/or server 206 to (1) identify a user profile associated with a user of a cloud-based storage service, (2) identify a plurality of data accounts within the user profile associated with the user of the cloud-based storage service, (3) detect a request from a client-based application associated with the user of the cloud-based storage service to access at least a portion of data stored in a data account within the user profile, (4) locate a unique account name that identifies the data account in the request, and then (5) satisfy the request from the client-based application associated with the user to access the portion of data stored in the data account via the cloud-based storage service by (a) locating a unique encryption key that corresponds to the data account identified by the unique account name, (b) decrypting the portion of data stored in the data account with the unique encryption key that corresponds to the data account, and then (c) providing a decrypted version of the portion of data stored in the data account to the client-based application associated with the user via the cloud-based storage service.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of one or more computing devices and/or storage devices capable of providing a cloud-based storage service. Examples of server 206 include, without limitation, application servers, web servers, storage servers, and/or database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
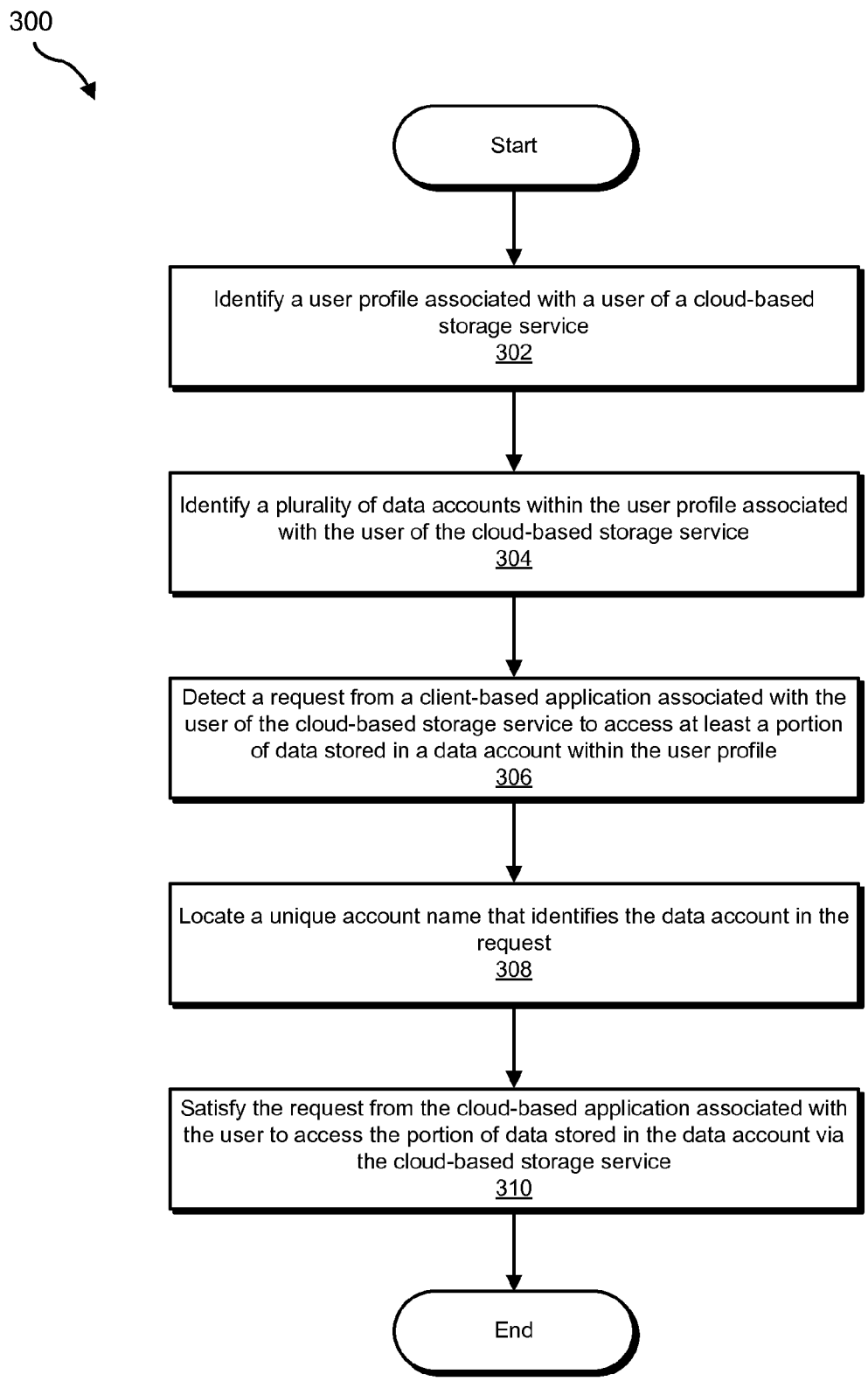
FIG. 3 is a flow diagram of an exemplary method for providing access to data accounts within user profiles via cloud-based storage services.

FIG. 3 is a flow diagram of an exemplary computer-implemented method 300 for providing access to data accounts within user profiles via cloud-based storage services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a user profile associated with a user of a cloud-based storage service. For example, at step 302 identification module 104 may, as part of server 206 in FIG. 2, identify user profile 120 associated with a user of cloud-based storage service 124. The phrase "user profile," as used herein, may refer to any type or form of collection of content (such as user data and/or data accounts) owned by or accessible to at least one particular user of a cloud-based storage service.

The systems described herein may perform step 302 in a variety of ways. In one example, identification module 104 may locate a profile database that includes user profile 120 on server 206. For example, identification module 104 may search server 206 for a profile database that includes a variety of user profiles associated with users of cloud-based storage service 124. In this example, identification module 104 may locate the profile database while searching server 206. Upon locating the profile database, identification module 104 may identify user profile 120 in the profile database.

In another example, identification module 104 may query cloud-based storage service 124 to identify user profile 120. For example, identification module 104 may query cloud-based storage service 124 for a listing of user profiles associated with users of cloud-based storage service 124. In this example, identification module 104 may receive a listing of the user profiles associated with such users from cloud-based storage service 124 in response to the query. Upon receiving the listing of user profiles from cloud-based storage service 124, identification module 104 may identify user profile 120 in the listing.

As illustrated in FIG. 3, at step 304 one or more of the systems described herein may identify a plurality of data accounts within the user profile associated with the user of the cloud-based storage service. For example, at step 304 identification module 104 may, as part of server 206 in FIG. 2, identify data accounts 122(1)-(N) within user profile 120 associated with the user of cloud-based storage service 124. The phrase "data account," as used herein, may refer to any type or form of grouping of data that has been categorized and/or otherwise distinguished based at least in part on one or more features of the data.

The systems described herein may perform step 304 in a variety of ways. In one example, identification module 104 may search the profile database for data accounts within user profile 120. In this example, upon identifying user profile 120 in the profile database, identification module 104 may identify data accounts 122(1)-(N) within user profile 120.

In another example, identification module 104 may locate a separate database that includes data accounts within user profile 120 on server 206. For example, identification module 104 may search server 206 for an account database that includes a variety of data accounts corresponding to the user profiles associated with the users of cloud-based storage service 124. In this example, identification module 104 may locate the account database while searching server 206.

Upon locating the account database, identification module 104 may search the account database for data accounts within user profile 120. Identification module 104 may identify data accounts 122(1)-(N) while searching the account database. Identification module 104 may then determine that data accounts 122(1)-(N) correspond to user profile 120.

In a further example, identification module 104 may query cloud-based storage service 124 to identify data accounts within user profile 120. For example, identification module 104 may query cloud-based storage service 124 for a listing of the data accounts within user profile 120. In this example, identification module 104 may receive a listing of the data accounts within user profile 120 from cloud-based storage service 124 in response to the query. Upon receiving the listing of data accounts within user profile 120 from server 206, identification module 104 may use the listing to identify data accounts 122(1)-(N) as being within user profile 120.

In some examples, authentication module 112 may, as part of server 206 in FIG. 2, authenticate client-based application 126 installed on computing device 202(1) with each of data accounts 122(1)-(N) within user profile 120. In one example, authentication module 112 may obtain user credentials associated with each of data accounts 122(1)-(N) within user profile 120 from client-based application 126 installed on computing device 202(1). For example, the user who owns user profile 120 may enter a single set of user credentials (such as a single username and password combination) capable of authenticating all of data accounts 122(1)-(N) into client-based application 126 installed on computing device 202(1). Additionally or alternatively, the user may enter a different set of user credentials (such as a different username and password combination) for each of data accounts 122(1)-(N) into client-based application 126 installed on computing device 202(1).

In one example, client-based application 126 may store the user credentials associated with data accounts 122(1)-(N) to facilitate authentication of client-based application 126 installed on computing device 202(1) with data accounts 122(1)-(N) via cloud-based storage service 124. For example, as the user attempts to access one or more data accounts 122(1)-(N) from computing device 202(1) via cloud-based storage service 124, client-based application 126 may direct computing device 202(1) to send the user credentials associated with data accounts 122(1)-(N) to server 206. In this example, server 206 may receive the user credentials from computing device 202(1).

Upon the receipt of the user credentials by server 206, authentication module 112 may obtain the user credentials and then search authentication database 214 associated with cloud-based storage service 124 for the user credentials. While searching authentication database 214, authentication module 112 may identify the same user credentials received by server 206 from computing device 202(1) within authentication database 214. Authentication module 112 may then authenticate client-based application 126 installed on computing device 202(1) with each of data accounts 122(1)-(N) by determining that these user credentials correspond to each of data accounts 122(1)-(N) within user profile 120.

Upon completion of this authentication process, the user may use client-based application 126 installed on computing device 202(1) to access each of data accounts 122(1)-(N) within user profile 120 via cloud-based storage service 124. As will be described in greater detail below, the user may also use client-based application 126 installed on computing device 202(1) to delegate access to one or more of data accounts 122(1)-(N) within user profile 120 to an additional instance of client-based application 126 associated with an additional user of cloud-based storage service 124 (e.g., client-based application 126 installed on computing device 202(N)).

In another example, authentication module 112 may facilitate delegating at least a portion of this authentication process to an additional instance of client-based application 126 associated with an additional user of cloud-based storage service 124. For example, authentication module 112 may enable client-based application 126 installed on computing device 202(N) to authenticate client-based application 126 installed on computing device 202(1) with one or more of data accounts 122(1)-(N). In this example, authentication module 112 may obtain user credentials associated with one or more of data accounts 122(1)-(N) from client-based application 126 installed on computing device 202(N).

In a more specific example, an employer of the user may maintain at least partial ownership of and/or access to data account 122(1) within user profile 120. For example, the user's employer may provide the user with data account 122(1) to enable the user to fulfill his or her duties as an employee. However, the user's employer may want to withhold the user credentials associated with data account 122(1) to maintain control over the user's access to the employer's data stored in data account 122(1) and/or ensure that the employer's data stored in data account 122(1) remains relatively secure via cloud-based storage service 124.

In this example, authentication module 112 may authenticate client-based application 126 installed on computing device 202(1) with data account 122(1) by obtaining the user credentials associated with data account 122(1) from client-based application 126 installed on computing device 202(N). For example, the employer may enter user credentials (such as a username and password combination) capable of authenticating data account 122(1) into client-based application 126 installed on computing device 202(N). In this example, the employer may also initiate an authentication request via client-based application 126 installed on computing device 202(N) to authenticate client-based application 126 installed on computing device 202(1) with data account 122(1). Client-based application 126 installed on computing device 202(N) may direct computing device 202(N) to send the user credentials and the authentication request to server 206. Server 206 may then receive the user credentials and the authentication request from client-based application 126 installed on computing device 202(N).

Upon receipt of the user credentials and the authentication request by server 206, authentication module 112 may obtain the user credentials and then search authentication database 214 associated with cloud-based storage service 124 for the user credentials. While searching authentication database 214, authentication module 112 may identify the same user credentials received by server 206 from computing device 202(N) within authentication database 214. Authentication module 112 may then authenticate client-based application 126 installed on computing device 202(1) with data account 122(1) in response to the authentication request by determining that these user credentials received from computing device 202(N) correspond to data account 122(1) within user profile 120.

In some examples, identification module 104 may identify a plurality of data zones within one or more of data accounts 122(1)-(N). For example, identification module 104 may identify data zones 210(1)-(N) in FIG. 2 within data account 122(1) and data zones 212(1)-(N) in FIG. 2 within data account 122(N). In one example, identification module 104 may identify data zones 210(1)-(N) and/or 212(1)-(N) while searching a database (e.g., a profile database, an account database, or a separate zone database) for data zones within data accounts 122(1)-(N). In another example, identification module 104 may identify data zones 210(1)-(N) and/or 212(1)-(N) upon querying cloud-based storage service 124 for data zones within data accounts 122(1)-(N).

As illustrated in FIG. 3, at step 306 one or more of the systems described herein may detect a request from a client-based application associated with the user of the cloud-based storage service to access at least a portion of data stored in a data account within the user profile. For example, at step 306 detection module 106 may, as part of server 206 in FIG. 2, detect a request from client-based application 126 installed on computing device 202(1) to access at least a portion of data (e.g., one or more files) stored in data account 122(1) within user profile 120. In this example, the request from client-based application 126 may have been initiated by the user who owns user profile 120.

Figure 4:
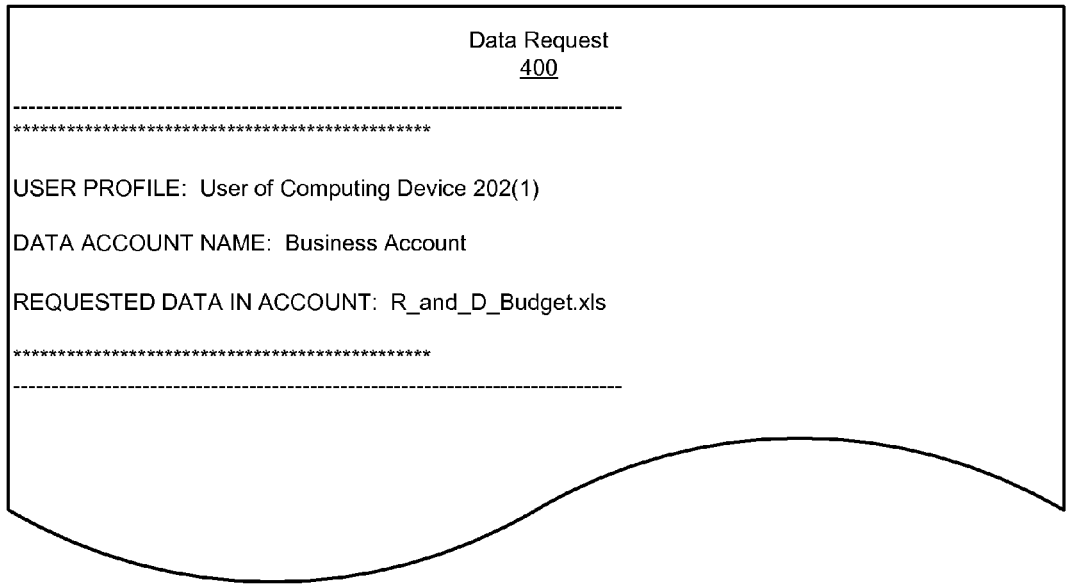
FIG. 4 is an illustration of exemplary requests to access data stored in data accounts within a user profile via a cloud-based storage service.
Figure 4:
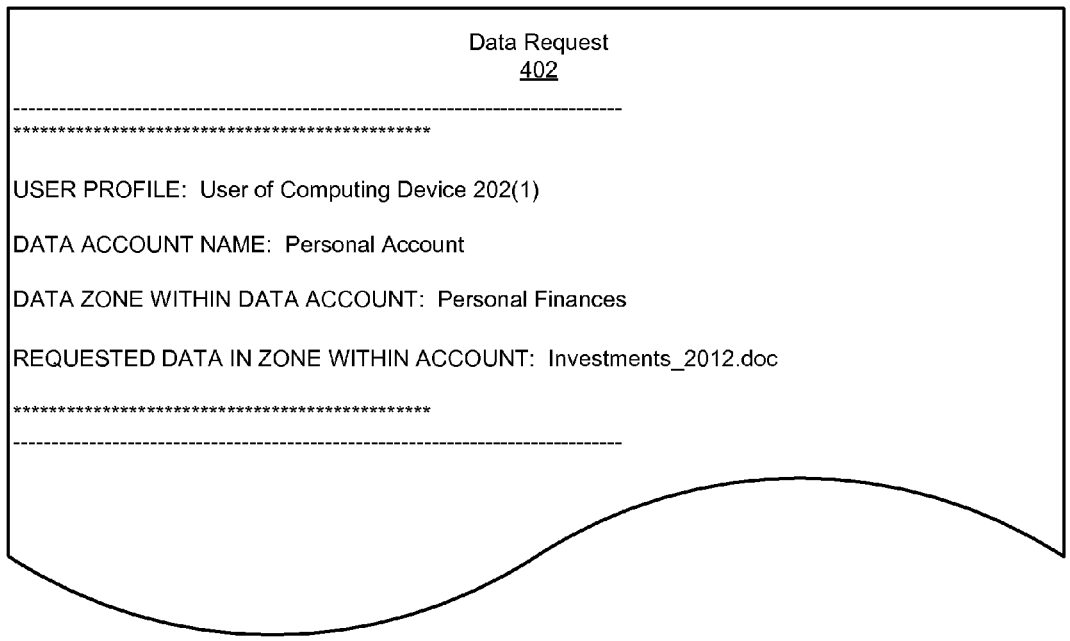

The systems described herein may perform step 306 in a variety of ways. In some examples, the user who owns user profile 120 may initiate data request 400 in FIG. 4 via client-based application 126 installed on computing device 202(1). As illustrated in FIG. 4, data request 400 may include information that identifies the user profile (in this example, "User of Computing Device 202(1)"), the name of the data account storing the requested data within the user profile (in this example, "Business Account"), and the requested data in the data account (in this example, "R_and_D_Budget.xls").

In one example, upon initiation of data request 400, client-based application 126 may direct computing device 202(1) to send data request 400 to server 206 via network 204. In this example, server 206 may receive data request 400 from computing device 202(1) via network 204. Detection module 106 may then detect and identify data request 400.

In some examples, the user who owns user profile 120 may initiate data request 402 in FIG. 4 via client-based application 126 installed on computing device 202(1). As illustrated in FIG. 4, data request 402 may include information that identifies the user profile (in this example, "User of Computing Device 202(1)"), the name of the data account storing the requested data within the user profile (in this example, "Personal Account"), the name of the data zone storing the requested data within the data account (in this example, "Personal Finances"), and the requested data in the data zone (in this example, "Investments_2012.doc").

In one example, upon initiation of data request 402, client-based application 126 may direct computing device 202(1) to send data request 402 to server 206 via network 204. In this example, server 206 may receive data request 402 from computing device 202(1) via network 204. Detection module 106 may then detect and identify data request 402.

As illustrated in FIG. 3, at step 308 one or more of the systems described herein may locate a unique account name that identifies the data account in the request from the client-based application associated with the user. For example, at step 308 locating module 108 may, as part of server 206 in FIG. 2, locate a unique account name that identifies data account 122(1) in the request from client-based application 122. In this example, locating module 108 may initiate the process of locating the unique account name in response to the detection of the request. The unique account name may indicate that the requested data is stored in data account 122(1) within user profile 120.

The systems described herein may perform step 308 in a variety of ways. In one example, in response to the detection of request 400, locating module 108 may locate the name "Business Account" in request 400. In this example, locating module 108 may then determine that the "Business Account" name located in request 400 corresponds to data account 122(1) within user profile 120.

In another example, in response to the detection of request 402, locating module 108 may locate the name "Personal Account" in request 402. In this example, locating module 108 may then determine that the "Personal Account" name located in request 402 corresponds to data account 122(N) within user profile 120.

In addition, locating module 108 may locate the name "Personal Finances" in request 402. In this example, locating module 108 may then determine that the "Personal Finances" name located in request 402 corresponds to data zone 212(N) within data account 122(N).

As illustrated in FIG. 3, at step 310 one or more of the systems described herein may satisfy the request from the client-based application associated with the user to access the portion of data stored in the data account via the cloud-based storage service. For example, at step 310 access module 110 may, as part of server 206 in FIG. 2, satisfy the request from client-based application 126 to access the portion of data stored in data account 122(1) via cloud-based storage service 124. In this example, access module 110 may initiate the process of satisfying the request after the unique account name identifying data account 122(1) has been located in the request.

The systems described herein may perform step 310 in a variety of ways. In one example, after the "Business Account" name has been located in request 400, access module 110 may locate encryption key 128(1) corresponding to data account 122(1). In this example, access module 110 may identify an encrypted version of the "R_and_D_Budget.xls" file stored in data account 122(1) and then decrypt the same with encryption key 128(1). Upon decrypting the "R_and_D_Budget.xls" file, access module 110 may direct server 206 to send a decrypted version of the same to client-based application 126 installed on computing device 202(1) via network 204.

In one example, prior to satisfying data request 400, access module 110 may facilitate uploading the "R_and_D_Budget.xls" file to data account 122(1) within user profile 120. For example, detection module 106 may detect a storage request from client-based application 126 to store the "R_and_D_Budget.xls" file to data account 122(1) within user profile 120. In response to the detection of the storage request from client-based application 126, locating module 108 may locate the "Business Account" name that corresponds to data account 122(1) in the storage request. After the "Business Account" name that corresponds to data account 122(1) has been located in the storage request, access module 110 may satisfy the storage request from client-based application 126 via the cloud-based storage service 124.

In one example, access module 110 may locate encryption key 128(1) corresponding to data account 122(1) and then encrypt the "R_and_D_Budget.xls" file with encryption key 128(1). Upon encrypting the "R_and_D_Budget.xls" file, access module 110 may store an encrypted version of the same in data account 122(1) within user profile 120 in response to the storage request.

In another example, after the "Personal Account" and "Personal Finances" names have been located in request 402, access module 110 may locate encryption key 128(N) corresponding to data zone 212(N) within data account 122(N). In this example, access module 110 may identify an encrypted version of the "Investments_2012.doc" file stored in data zone 212(N) within data account 122(N) and then decrypt the same with encryption key 128(N). Upon decrypting the "Investments_2012.doc" file, access module 110 may direct server 206 to send a decrypted version of the same to client-based application 126 installed on computing device 202(1) via network 204.

In some examples, delegation module 114 may enable client-based application 126 installed on computing device 202(1) to delegate access to data account 122(1) within user profile 120 to an additional instance of client-based application 126 associated with an additional user of cloud-based storage service 124. For example, detection module 106 may detect a delegation request from client-based application 126 installed on computing device 202(1) to delegate access to data account 122(1) within user profile 120 to an additional instance of client-based application 126 (e.g., client-based application 126 installed on computing device 202(N)).

In one example, in response to the detection of the delegation request, locating module 108 may locate the "Business Account" name that corresponds to data account 122(1) in the delegation request. Delegation module 114 may then satisfy the delegation request by delegating access to data account 122(1) within user profile 120 to the additional instance of client-based application 126 associated with the additional user of cloud-based storage service 124. After the delegation request has been satisfied, the additional instance of client-based application 126 may be able to access data account 122(1) within user profile 120 but unable to access data account 122(N) within user profile 120.

In some examples, delegation module 114 may enable client-based application 126 installed on computing device 202(1) to delegate access to data zone 212(N) within data account 122(N) to the additional instance of client-based application 126 associated with the additional user of cloud-based storage service 124. For example, detection module 106 may detect a delegation request from client-based application 126 installed on computing device 202(1) to delegate access to data zone 212(N) within data account 122(N) to an additional instance of client-based application 126 (e.g., client-based application 126 installed on computing device 202(N)).

In one example, in response to the detection of the delegation request, locating module 108 may locate the "Personal Account" and "Personal Finances" names corresponding to data account 122(N) and data zone 212(N), respectively, in the delegation request. Delegation module 114 may then satisfy the delegation request by delegating access to data zone 212(N) within data account 122(N) to the additional instance of client-based application 126 associated with the additional user via cloud-based storage service 124. After the delegation request has been satisfied, the additional instance of client-based application 126 may be able to access data zone 212(N) within data account 122(N) but unable to access data zones 210(1)-(N) within data account 122(1) or data zone 212(1) within data account 122(N).

As explained above in connection with method 300 in FIG. 3, an employee of an organization may store work-related data as well as personal data via a cloud-based storage service. For example, the employee may maintain a user profile that includes a work-related account encrypted by one encryption key and a personal account encrypted by another encryption key. In this example, the employee may separate work-related data from personal data within his or her user profile by storing uniquely encrypted work-related data in the work-related account and uniquely encrypted personal data in the personal account via the cloud-based storage service.

The cloud-based storage service may facilitate access to the work-related and personal accounts within the employee's user profile based at least in part on the unique names of the accounts. For example, the employee may assign the name "Business Account" to the work-related account within his or her user profile and then configure the work-related account to be accessible to the organization. In addition, the employee may assign the name "Personal Account" to the personal account within his or her user profile and then configure the personal account to be inaccessible to the organization.

After the employee has configured the work-related account to be accessible to the organization, the cloud-based storage system may authenticate at least one computing device of the organization (e.g., a computing device used by the organization's Information Technology (IT) specialist) with the work-related account. The cloud-based storage system may then enable the organization's authenticated computing device to access the work-related account within the employee's user profile in the event that the organization's authenticated computing device requests access to data stored in the account named "Business Account." However, the cloud-based storage system may still block the organization's authenticated computing device from accessing the personal account within the employee's user profile in the event that the organization's authenticated computing device requests access to data stored in account named "Personal Account."

Accordingly, by providing unique account names and unique encryption keys to the accounts within the employee's user profile, the cloud-based storage service may enable the employee to securely separate work-related data and personal data within his or her user profile. In addition, by securely separating the employee's work-related data and personal data within his or her user profile, the cloud-based storage service may enable the organization to access the work-related data within the employee's user profile while denying the organization access to the personal data within the employee's user profile.

Figure 5:
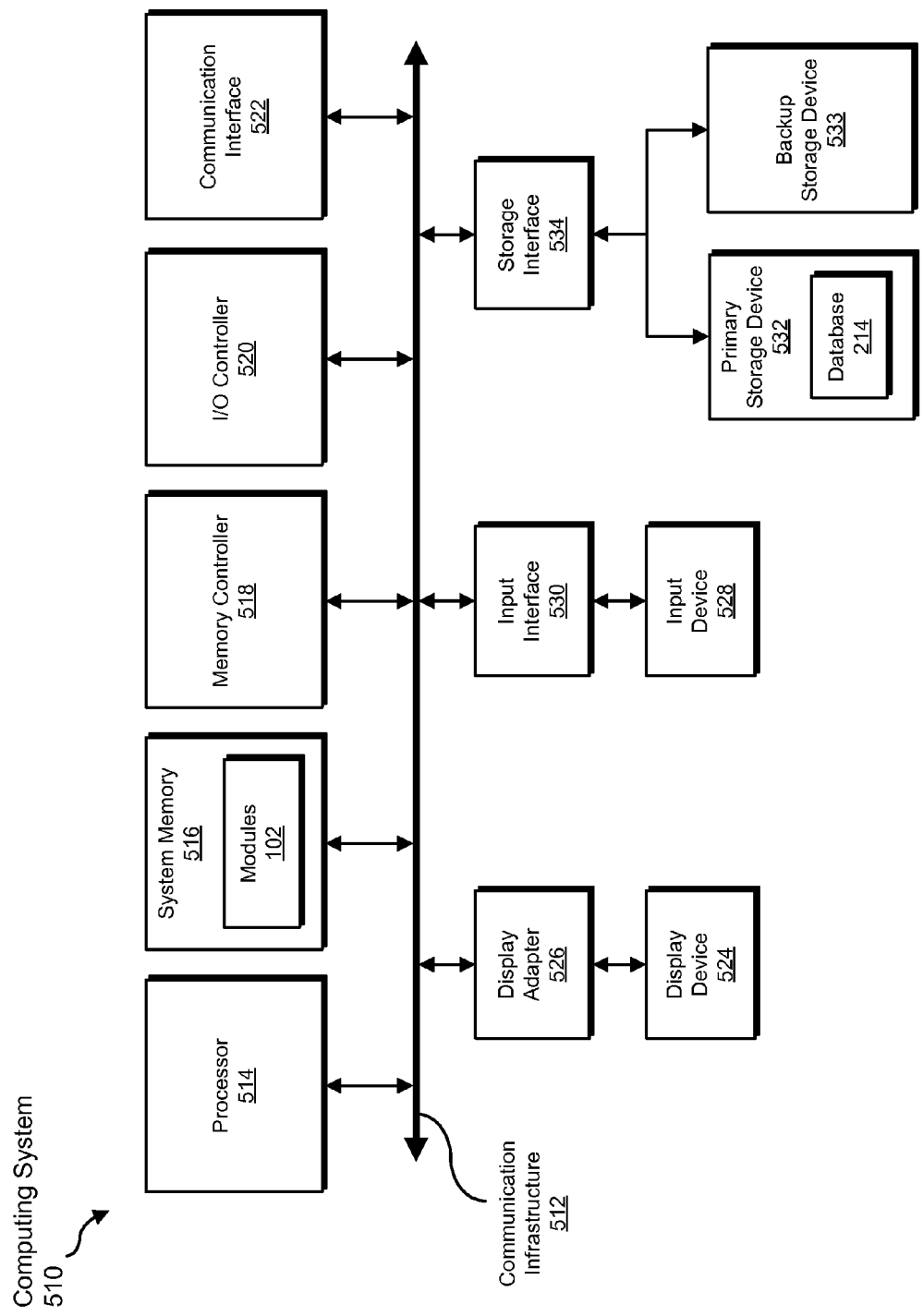
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, detecting, locating, satisfying, decrypting, providing, authenticating, enabling, obtaining, searching, determining, delegating, encrypting, and storing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, authentication database 214 from FIG. 2 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
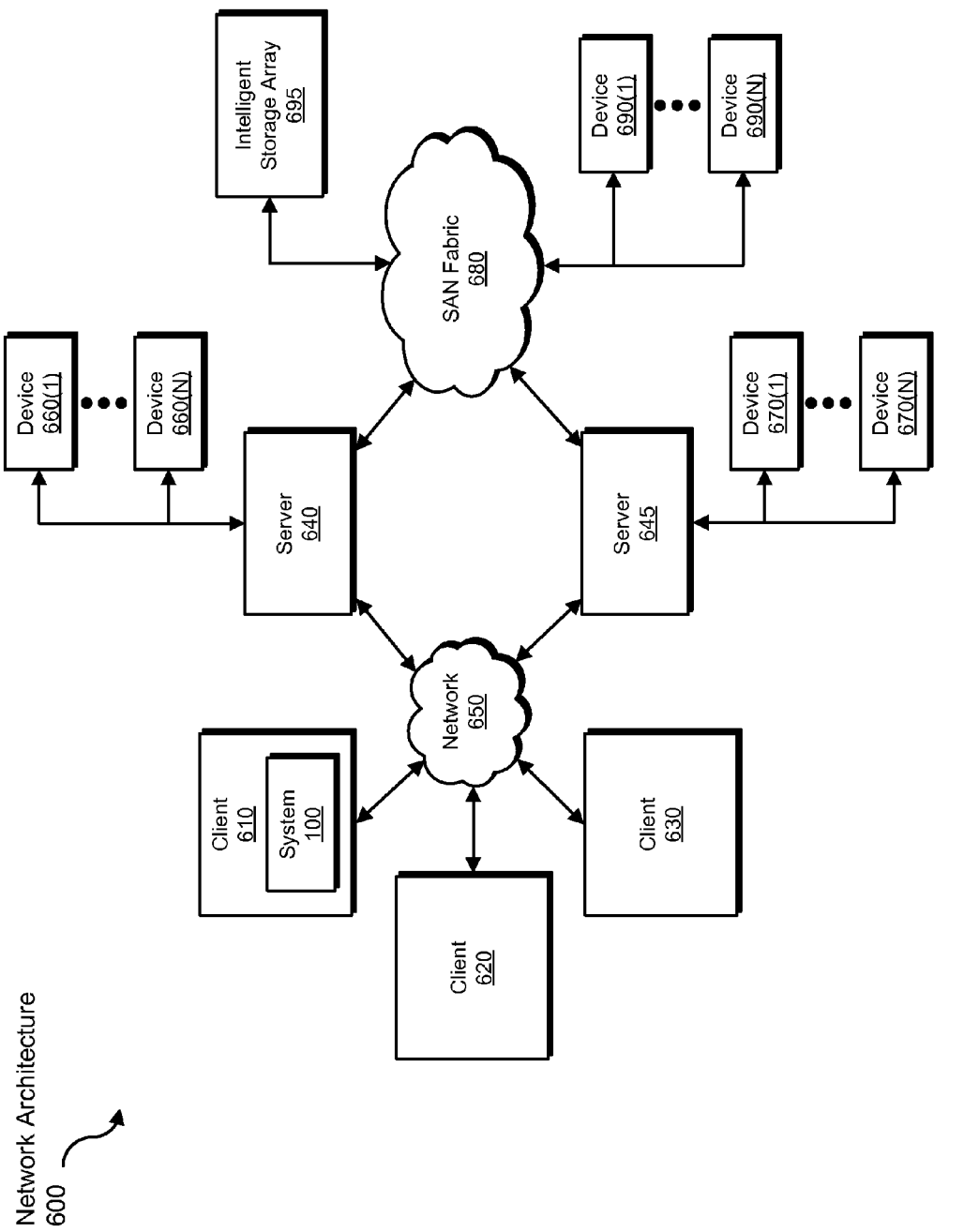
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, detecting, locating, satisfying, decrypting, providing, authenticating, enabling, obtaining, searching, determining, delegating, encrypting, and storing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for providing access to data accounts within user profiles via cloud-based storage services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data from a computing device, transform the data by encrypting the data, output a result of the transformation to facilitate storing the encrypted data via a cloud-based storage service, and then store the result of the transformation via the cloud-based storage service. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing access to data accounts within user profiles via cloud-based storage services, at least a portion of the method being performed by a computing device comprising at least one processor, the method comprising:
identifying a user profile associated with a user of a cloud-based storage service;
identifying a plurality of data accounts within the user profile associated with the user of the cloud-based storage service;
authenticating a client-based application associated with the user with a data account within the user profile by:
delegating authentication between the client-based application associated with the user and the data account within the user profile to a client-based application associated with an additional user of the cloud-based storage service;
upon delegating the authentication:
obtaining user credentials associated with the data account from the client-based application associated with the additional user of the cloud-based storage service;
searching an authentication database associated with the cloud-based storage service for the user credentials obtained from the client-based application associated with the additional user;
identifying the user credentials obtained from the client-based application associated with the additional user while searching the authentication database associated with the cloud-based storage service;
upon identifying the user credentials while searching the authentication database, determining that the user credentials correspond to the data account within the user profile;
detecting a request from the client-based application associated with the user of the cloud-based storage service to access at least a portion of data stored in the data account within the user profile;
in response to detecting the request from the client-based application associated with the user, locating a unique account name that identifies the data account in the request;
upon locating the unique account name that identifies the data account in the request, satisfying the request from the client-based application associated with the user to access the portion of data stored in the data account via the cloud-based storage service by:
locating a unique encryption key that corresponds to the data account identified by the unique account name;
decrypting the portion of data stored in the data account with the unique encryption key that corresponds to the data account;
providing a decrypted version of the portion of data stored in the data account to the client-based application associated with the user via the cloud-based storage service.

2. The method of claim 1, further comprising:
authenticating the client-based application associated with the user with each of the data accounts within the user profile;
in response to authenticating the client-based application associated with the user with each of the data accounts within the user profile, enabling the client-based application associated with the user to access each of the data accounts within the user profile.

3. The method of claim 2, wherein authenticating the client-based application associated with the user with each of the data accounts within the user profile comprises:
obtaining user credentials associated with each of the plurality of data accounts within the user profile from the client-based application associated with the user;
searching the authentication database associated with the cloud-based storage service for the user credentials obtained from the client-based application associated with the user;
identifying the user credentials obtained from the client-based application associated with the user while searching the authentication database associated with the cloud-based storage service;
upon identifying the user credentials while searching the authentication database, determining that the user credentials correspond to each of the plurality of data accounts within the user profile.

4. The method of claim 3, wherein obtaining the user credentials associated with each of the plurality of data accounts within the user profile comprises obtaining a single set of user credentials associated with each of the plurality of data accounts within the user profile from the client-based application associated with the user.

5. The method of claim 3, wherein obtaining the user credentials associated with each of the plurality of data accounts within the user profile comprises obtaining a different set of user credentials for each of the plurality of data accounts within the user profile from the client-based application associated with the user.

6. The method of claim 1, further comprising, prior to satisfying the request to access the portion of data stored in the data account within the user profile:
detecting a storage request from the client-based application associated with the user to store the portion of data in the data account;
in response to detecting the storage request from the client-based application associated with the user, locating the unique account name that identifies the data account in the storage request;
upon locating the unique account name that identifies the data account in the storage request, satisfying the storage request from the client-based application associated with the user via the cloud-based storage service by:
locating the unique encryption key that corresponds to the data account identified by the unique account name;
encrypting the portion of data to be stored in the data account with the unique encryption key that corresponds to the data account;
storing an encrypted version of the portion of data in the data account within the user profile via the cloud-based storage service.

7. The method of claim 1, further comprising:
upon authenticating the client-based application associated with the user with the data account within the user profile, enabling the client-based application associated with the user to delegate access to the data account within the user profile to a client-based application associated with another user of the cloud-based storage service.

8. The method of claim 7, wherein enabling the client-based application associated with the user to delegate access to the data account within the user profile to the client-based application associated with the other user comprises:
   detecting a delegation request from the client-based application associated with the user to delegate access to the data account within the user profile to the client-based application associated with the other user;
   in response to detecting the delegation request from the client-based application associated with the user, locating a unique account name that identifies the data account in the delegation request;
   upon locating the unique account name that identifies the data account in the delegation request, satisfying the delegation request from the client-based application associated with the user by delegating access to the data account within the user profile to the client-based application associated with the other user via the cloud-based storage service.

9. The method of claim 8, wherein delegating access to the data account within the user profile comprises delegating access to the data account within the user profile such that the client-based application associated with the other user is able to access the data account within the user profile but unable to access the plurality of data accounts within the user profile.

10. The method of claim 1, wherein identifying the plurality of data accounts within the user profile associated with the cloud-based storage service comprises identifying a plurality of data zones within the data account identified by the unique account name.

11. The method of claim 10, wherein locating the unique account name that identifies the data account in the request comprises locating a unique zone name that identifies a data zone within the data account.

12. The method of claim 11, wherein satisfying the request from the client-based application associated with the user to access the portion of data stored in the data account via the cloud-based storage service comprises:
   locating a unique encryption key that corresponds to the data zone identified by the unique zone name;
   decrypting at least a portion of data stored in the data zone within the data account with the unique encryption key that corresponds to the data zone;
   providing a decrypted version of the portion of data stored in the data zone within the data account to the client-based application associated with the user via the cloud-based storage service.

13. The method of claim 10, further comprising:
   detecting a delegation request from the client-based application associated with the user to delegate access to a data zone within the data account to a client-based application associated with another user of the cloud-based storage service;
   in response to detecting the delegation request from the client-based application associated with the user, locating a unique zone name that identifies the data zone within the data account in the delegation request;
   upon locating the unique zone name that identifies the data zone within the data account in the delegation request, satisfying the delegation request from the client-based application associated with the user by delegating access to the data zone within the data account to the client-based application associated with the other user via the cloud-based storage service.

14. The method of claim 13, wherein delegating access to the data zone within the data account comprises delegating access to the data zone within the data account such that the client-based application associated with the other user is able to access the data zone within the data account but unable to access the plurality of data zones within the data account.

15. A system for providing access to data accounts within user profiles via cloud-based storage services, system comprising:
   an identification module programmed to:
      identify a user profile associated with a user of a cloud-based storage service;
      identify a plurality of data accounts within the user profile associated with the user of the cloud-based storage service;
   an authentication module programmed to authenticate a client-based application associated with the user with a data account within the user profile by:
      delegating authentication between the client-based application associated with the user and the data account within the user profile to a client-based application associated with an additional user of the cloud-based storage service;
      upon delegating the authentication:
         obtaining user credentials associated with the data account from the client-based application associated with the additional user of the cloud-based storage service;
         searching an authentication database associated with the cloud-based storage service for the user credentials obtained from the client-based application associated with the additional user;
         identifying the user credentials obtained from the client-based application associated with the additional user while searching the authentication database associated with the cloud-based storage service;
      upon identifying the user credentials while searching the authentication database, determining that the user credentials correspond to the data account within the user profile;
   a detection module programmed to detect a request from the client-based application associated with the user of the cloud-based storage service to access at least a portion of data stored in the data account within the user profile;
   a locating module programmed to locate a unique account name that identifies the data account in the request;
   an access module programmed to satisfy the request from the client-based application associated with the user to access the portion of data stored in the data account via the cloud-based storage service by:
      locating a unique encryption key that corresponds to the data account identified by the unique account name;
      decrypting the portion of data stored in the data account with the unique encryption key that corresponds to the data account;
      providing a decrypted version of the portion of data stored in the data account to the client-based application associated with the user via the cloud-based storage service;
   at least one processor configured to execute the identification module, the detection module, the locating module, and the access module.

16. The system of claim 15, wherein:
  the authentication module is further programmed to authenticate the client-based application with each of the data accounts within the user profile;
  the access module is further programmed to enable the client-based application to access each of the data accounts within the user profile in response to the authentication of the client-based application with each of the data accounts within the user profile.

17. The system of claim 16, wherein the authentication module is programmed to:
  obtain user credentials associated with each of the plurality of data accounts within the user profile from the client-based application associated with the user;
  search the authentication database associated with the cloud-based storage service for the user credentials obtained from the client-based application associated with the user;
  identify the user credentials obtained from the client-based application associated with the user while searching the authentication database associated with the cloud-based storage service;
  determine that the user credentials obtained from the client-based application associated with the user correspond to each of the plurality of data accounts within the user profile.

18. The system of claim 16, further comprising a delegation module programmed to enable the client-based application associated with the user to delegate access to the data account within the user profile to a client-based application associated with another user of the cloud-based storage service.

19. A non-transitory computer-readable-storage medium comprising one or more computer-executable instructions that, when executed by at least one processor of a computing device, cause the computing device to:
  identify a user profile associated with a user of a cloud-based storage service;
  identify a plurality of data accounts within the user profile associated with the user of the cloud-based storage service;
  authenticate a client-based application associated with the user with a data account within the user profile by:
    delegating authentication between the client-based application associated with the user and the data account within the user profile to a client-based application associated with an additional user of the cloud-based storage service;
    upon delegating the authentication:
      obtaining user credentials associated with the data account from the client-based application associated with the additional user of the cloud-based storage service;
      searching an authentication database associated with the cloud-based storage service for the user credentials obtained from the client-based application associated with the additional user;
      identifying the user credentials obtained from the client-based application while searching the authentication database associated with the cloud-based storage service;
    upon identifying the user credentials while searching the authentication database, determining that the user credentials correspond to the data account within the user profile;
  detect a request from a client-based application associated with the user of the cloud-based storage service to access at least a portion of data stored in a data account within the user profile;
  locate a unique account name that identifies the data account in the request;
  satisfy the request from the client-based application associated with the user to access the portion of data stored in the data account via the cloud-based storage service by:
    locating a unique encryption key that corresponds to the data account identified by the unique account name;
    decrypting the portion of data stored in the data account with the unique encryption key that corresponds to the data account;
    providing a decrypted version of the portion of data stored in the data account to the client-based application associated with the user via the cloud-based storage service.

* * * * *

UNITED STATES PATENT AND TRADEMARK OFFICE
CERTIFICATE OF CORRECTION

| | | |
|---|---|---|
| PATENT NO. | : 8,904,503 B2 | Page 1 of 1 |
| APPLICATION NO. | : 13/742217 | |
| DATED | : December 2, 2014 | |
| INVENTOR(S) | : Paul Agbabian | |

It is certified that error appears in the above-identified patent and that said Letters Patent is hereby corrected as shown below:

In the Claims

Claim 15, at column 24, lines 7-9, should read:

A system for providing access to data accounts within user profiles via cloud-based storage services, the system comprising:

Signed and Sealed this
Twenty-sixth Day of May, 2015

Michelle K. Lee
*Director of the United States Patent and Trademark Office*